(No Model.)

J. BOWER.
HORSE HAY RAKE.

No. 284,942. Patented Sept. 11, 1883.

Attest
F. E. Young
Levi Bacon

Inventor
John Bower
By Wm. R. Singleton
Atty.

UNITED STATES PATENT OFFICE.

JOHN BOWER, OF GOODE'S CROSSING, VIRGINIA.

HORSE HAY-RAKE.

SPECIFICATION forming part of Letters Patent No. 284,942, dated September 11, 1883.

Application filed May 24, 1883. (No model.)

*To all whom it may concern:*

Be it known that I, JOHN BOWER, a citizen of the United States, residing at Goode's Crossing, in the county of Bedford and State of Virginia, have invented certain new and useful Improvements in Horse Hay-Rakes, of which the following is a specification, reference being had therein to the accompanying drawings.

This invention relates to certain improvements in horse hay-rakes, which will be hereinafter particularly described, and pointed out in the claim.

Figure 1:
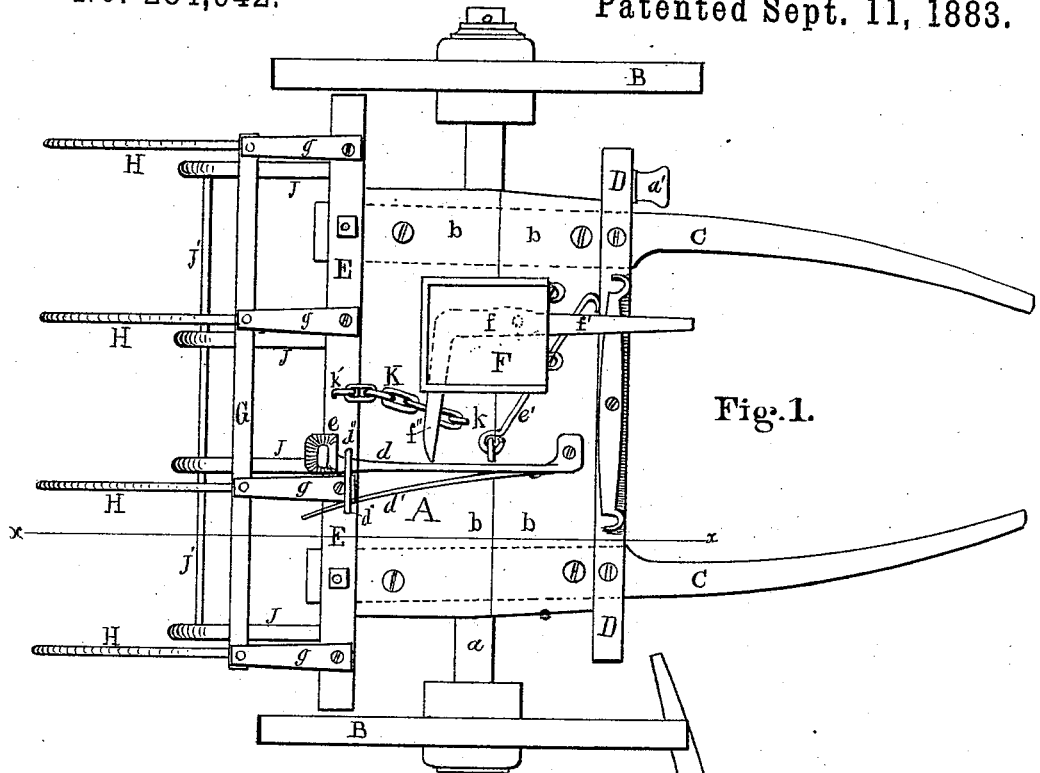
Figures 2, 3:
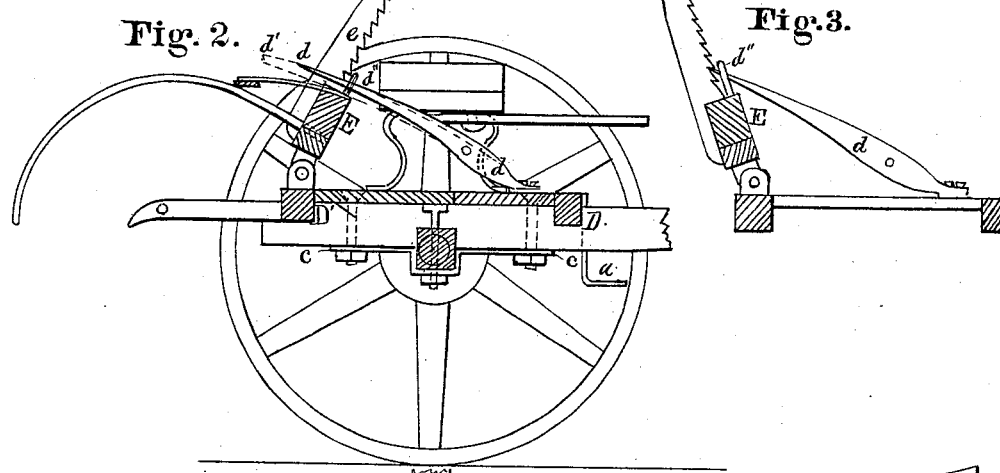
Figure 4:
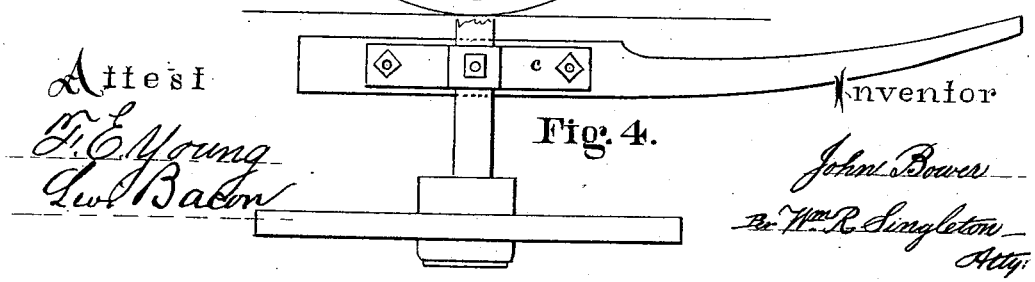

In the drawings accompanying and forming a part of this specification, Figure 1 is a plan view of the machine. Fig. 2 is a longitudinal vertical section on $x$ $x$ of Fig. 1. Fig. 3 is an end view of the rake-bar detached, and showing the pawl engaged with the rack. Fig. 4 shows the details of construction of the axle-fastenings.

A is the bed-frame of the rake, having an ordinary axle, $a$, with two wheels, B B.

Attached to the axle $a$ are the shafts C C, well secured and braced by front and rear tail-bars, D D', to prevent their being racked. Boards $b$ $b$ are fastened to the shafts C C, between the front bar, D, across the shafts, and tail-bar D'.

The axle $a$ is supported under the bed-frame A by straps of plate-iron $c$ $c$, which are firmly bolted through the shafts, and thus hold firmly and securely the axle $a$ to the bed-frame A. The rake-bar E is hinged to the tail-bar D', and has a handle, $e$, which has a notched plate on its front side to receive a pawl, $d$.

On the side of pawl $d$ is a long spring, $d'$, and these both work inside of the loop $d''$.

Underneath the seat F is a lever, $f$, bent at right angles, having its long arm $f'$ projecting out in front of the seat, to be operated upon by the legs of the driver. The other arm, $f''$, of the lever $f$ works against the side of the pawl $d$, and when the end $f''$ is moved against the side of the pawl $d$ it is forced out of gear with the handle $e$, so that the handle $e$ can be pulled forward by the driver and the rake be correspondingly lifted to any height desired.

$e'$ is a hook attached to the bed $b$, which can be placed over the handle $e$, to keep it down when the rake is to be moved from place to place.

$a'$ is a step placed on the front rail of the bed-frame convenient for the driver to get up or down. The teeth H H H H of the rake are fixed in the bar E and curved, as usual. Extending from the rake-bar E and supported by arms $g$ $g$ $g$, &c., is the bar G, which stops the spring of the teeth H H H.

Projecting from the tail-bar D' are four or more rods, J, in the ends of which is a rod, J', which forms the guard to the rake-teeth.

K is a chain of links, which is fastened to the bed-board $b$ by a staple, $k$, and on the upper side of the rake-bar E is a hook, $k'$, for fastening any one of the links of the chain K, to prevent the rake-teeth from dropping too low.

F is the driver's seat, and underneath it is the bent lever $f$, as before described, pivoted to the bottom of the seat.

In ordinary horse-rakes, heretofore little or no attention has been paid to the proper distribution of the weight of the machine and load with reference to the amount to be placed upon the back of the animal drawing the machine. In the present arrangement I have so located the axle in the frame upon which the rake is pivoted as to accomplish, practically, the proper adjustment of the weight behind, so as to relieve the animal as much as may be desired. Hence I call this machine the "balanced horse-rake."

In the form and arrangement of the spring $d'$ and pawl $d$ within the loop $d''$ it will be seen that as the rake-bar E is pulled forward the loop passes to the narrow part of the spring's distance from the pawl, and the resistance of the spring is lessened, and the movement of the bar is made easy after the rake-teeth are lifted with the load upon them.

I have introduced into the construction of the bed of a horse-rake the bottom boards, $b$ $b$, which being securely and firmly fastened to the shafts and abutting upon the front and rear cross-bars, D D', the whole structure is so well braced that the bed-frame is prevented from shaking or twisting. The axle $a$, being secured to the shafts and bed by means of the straps *c c*, also adds additional strength to the whole machine, and I claim that in these particulars I have greatly improved the construction of horse hay-rakes.

I claim—

The combination, with the rake-head, of the hand-lever, having a toothed rack, the pawl *d*, with its attached spring *d'*, loop *d''*, and bent lever *f*, substantially as and for the purpose described.

In testimony whereof I affix my signature in presence of two witnesses.

JOHN BOWER.

Witnesses:
 D. J. MAENETZ,
 J. R. BOWER.